(12) United States Patent
Sessions

(10) Patent No.: US 12,006,191 B2
(45) Date of Patent: *Jun. 11, 2024

(54) FLEET AND TWIST TOLERANT FLAT BELT DESIGN

(71) Applicant: Liftwave, Inc., Somerville, MA (US)

(72) Inventor: Blake Sessions, Boston, MA (US)

(73) Assignee: Liftwave, Inc., Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,670

(22) Filed: Dec. 5, 2022

(65) Prior Publication Data

US 2023/0099195 A1  Mar. 30, 2023

Related U.S. Application Data

(63) Continuation of application No. 16/415,478, filed on May 17, 2019, now Pat. No. 11,535,498.

(60) Provisional application No. 62/672,786, filed on May 17, 2018.

(51) Int. Cl.
*B66D 1/28* (2006.01)
*B29D 29/00* (2006.01)
*B29K 75/00* (2006.01)
*B66B 7/06* (2006.01)
*B66D 3/04* (2006.01)

(52) U.S. Cl.
CPC ............... *B66D 1/28* (2013.01); *B29D 29/00* (2013.01); *B29K 2075/00* (2013.01); *B66B 7/062* (2013.01); *B66D 3/04* (2013.01)

(58) Field of Classification Search
CPC ... B66D 1/00; B66D 1/28; B66D 1/66; B29D 29/00; B29K 2075/00
USPC .......................................... 428/35.7
See application file for complete search history.

(56) References Cited

U.S. PATENT DOCUMENTS

| | | | |
|---|---|---|---|
| 7,086,217 B2 | 8/2006 | Eichhorn et al. | |
| 8,100,796 B2 | 1/2012 | O'Donnell | |
| 8,449,349 B2 | 5/2013 | Thompson et al. | |
| 10,556,775 B2 | 2/2020 | Wesson et al. | |
| 11,535,498 B2 * | 12/2022 | Sessions | B29D 29/00 |

* cited by examiner

*Primary Examiner* — Lars A Olson
(74) *Attorney, Agent, or Firm* — Fish & Richardson P.C.

(57) ABSTRACT

Flat belt apparatuses and methods are provided where one or more cords in the flat belt are tensioned or pre-tensioned to extend the service life of the flat belt.

10 Claims, 5 Drawing Sheets

Belt tension profile with twisted conditions

FLEET AND TWIST TOLERANT FLAT BELT DESIGN

RELATED APPLICATION

The present application is a continuation of U.S. Ser. No. 16/415,478, filed on May 17, 2019, which claims priority to U.S. Provisional Patent Application No. 62/672,786, filed on May 17, 2018, entitled "Fleet and Twist Tolerant Flat Belt Design," and each application is incorporated herein by reference in its entirety.

TECHNICAL FIELD

The present disclosure relates to the design of belt-based power transfer systems comprised of substantially wide and flat belts intended for wire rope replacement.

BACKGROUND

Open-ended flat belts are used to transfer power in oscillatory linear applications such as elevators, forklifts, and scissor lifts. Recent innovations in the material construction of flat belts have resulted in dramatic improvement of belt performance, with corresponding widespread adoption of flat belts across many industries. These belts have many advantages over wire ropes, including maintenance-free operation for an extended service life, a low cost of manufacture, and a small design envelope given a set of working loads. The constitution of a flat belt is generally a set of wire ropes laid out in a parallel fashion within a polyurethane jacket of Shore 85 A or 92 A hardness.

The belts are manufactured in a manner similar to that of timing belts. Wire ropes are laid out in parallel within the context of a molding or extrusion machine and then overmolded with high injection pressure, forcing polyurethane into any voids that are present while also forming a chemical bond with the steel rope. As the belts have gained market traction in recent years, two important lessons have been learned regarding the manufacture of steel reinforced polyurethane belts. First, alternating ropes of left hand and right hand lay is crucial. Without this technique, the reinforcing ropes tend to pull the belt asymmetrically toward one of the flanges, causing misalignment and premature failure. Second, the ropes must be tensioned equitably during the molding process, or else the total belt tension is not distributed equally among the ropes during service. This causes premature failure as some of the ropes receive higher tensile loads than others. The wear of a wire rope is one that accelerates by its nature: Once a particular wire, strand, or rope has failed, additional tensile stresses are imposed upon its neighbors, causing subsequent failure of those elements and leading to the rapid detriment of the belt as a system. Thus, maintaining uniformity of tension is of the upmost importance both during production of the belts as well as while they're in service.

Steel-reinforced flat belts are known to be quite sensitive to misalignment. While singular steel wire ropes can easily tolerate fleet angles of +/−1.5 degrees on a sheave, flat belts can tolerate just ~5-10 minutes of arc before they are at risk of premature failure. In the eyes of machine designers, many rope-driven machine applications preclude the use of flat belts: After all, ropes are flexible in all directions, and belts are flexible along just one primary axis.

The statement that wire ropes are tolerant of fleet angles while flat belts are sensitive and intolerant to fleet angles may be true but perhaps is incomplete:

Manufacturers of both technologies typically have recommendations as to the maximum permissible fleet angle. In the case of flat belts, +/−0.25 degrees (15 minutes of arc) is a common, if perhaps overly generous, recommendation. Thus, in the case of both wire ropes and flat belts, a tolerance band applies to the reeving system, with the magnitude of the tolerance band of flat belts being approximately ¹⁄₁₀ the magnitude of the tolerance band of wire rope.

The present invention has two aims. The first is to normalize belt reinforcement tension in angular drive applications, and the second is to expand the tolerance band of a flat belt in service with a particular service life expectation. To elaborate on the second aim, a flat belt made with a standard process of manufacture will have an optimal service life with perfect alignment, and will have a given tolerance band of +/−10 minutes of arc for, say, a 15% reduction in service life as compared to the ideal, perfectly aligned circumstance. The present invention seeks to expand that tolerance band with the same 15% reduction in service life expectation to, say, +/−30 minutes of arc in order to enable reeving applications that are currently the exclusive domain of wire rope. In other words, the present invention seeks to laterally expand the plot of service life as a function of fleet angle misalignment.

SUMMARY

Disclosed herein are methods, systems, and components for the manufacture of a flat belt intended for reeving applications that is more tolerant of twisted conditions and fleet angles, both of which are naturally present in many reeving systems.

Two simple observations can be drawn regarding the current application of flat belts and their potential for use in reeving systems that require twisted spans and/or wider fleet angle tolerance bands.

The first observation is statistical in nature: Both fleet angles and twisted spans result in additional tensile stresses along the edges of the belt. Without exception, a belt that is heavily twisted or fleeted will fail along its edges first. This implies that, within the context of these severe and poorly aligned reeving conditions, having additional tensile load carried by the centermost ropes would be preferable: Ideally, the centermost ropes would carry more of the tension on average in well aligned conditions so that the outermost ropes may provide service where twisted spans or fleet angles are present. An optimally designed flat belt would exhibit uniform failures across the width of the belt at different locations: Failures along the edges would be attributed to the additional induced stresses where harsh alignment conditions are present, and failures in the center of the belt would be attributed to the more severe cyclic bending conditions imposed upon the center of the belt when it is well aligned.

The second observation draws an analogy to lessons learned by the bearing industry. One of the benefits of deep groove ball bearings is their relatively high tolerance to misalignment: Though recommendations vary, in some circumstances deep groove ball bearings can tolerate as much as 10 minutes of arc of misalignment! Even needle roller bearings have a very small misalignment capability of +/−1 minute of arc, though clearly the more well-aligned the bearing is, the better its service life will be. Given modern manufacturing methods, ensuring alignment is usually relatively straight-forward, but even minor issues like shaft flexion or thermal expansion often lead to slight misalignments on the order of a minute of arc.

Ball bearings weren't always designed this way: Originally, deep groove ball bearing raceways carried a geometry that nearly matched that of the balls, essentially forcing true angular alignment. This caused extraordinarily high stresses when even slight forced misalignments were present, resulting in premature bearing failure. They learned to relax the curvature of the raceways ever so slightly, so as allow the hertzian contact patch to shift laterally if a misalignment is imposed on the bearing. Other bearings, such as cross-roller bearings or paired angular contact bearings, provide a rigid definition to shaft alignment that must be respected by the rest of the system.

The present invention seeks to provide similar functionality to the deep groove ball bearing by altering the pretension of the wire ropes as they're molded into a belt jacket. Instead of each wire rope being pretensioned equally as the over-molding is performed, the center strands are tensioned more highly than the outer strands along the edges of the belt. Once the molding has been performed and the belt is released, this results in the slight relaxation of the outer strands with respect to the inner strands. As the belt is loaded up in service, the center strands will initially carry more load. If the belt were to be run in perfectly aligned conditions, we'd expect to see failures along the centerline of the belt. However, if the belt is run in twisted or fleeted conditions, we'd see failures with a more uniform distribution across the width of the belt. In the case of fleet angles being present, we would observe the tension distribution of the belt "rolling" back and forth within the cross section, from one edge, through the center, to the opposite edge, and back again, as the belt runs over sheaves with fleet angles present.

The second aim of the present invention is to provide additional tolerance for twisted conditions. It's well known that the twisting of a belt causes a parabolic increase in strain from the centerline of the belt to its outermost edges, which is to be avoided with a belt that has been molded with wire ropes of equal tension. Continental recommends a twist ratio, which is defined as the transition length over which a 90 degree twist takes place divided by the belt width, of no less than 20:1. The derivation of induced strain as a function of twist ratio is straight-forward, and at a 20:1 twist ratio the additional strain that the outer ropes experience is approximately 0.07%. Compare this to the maximum rope elongation of 0.6% that wire rope reinforced flat belts commonly experience to see that additional tensile stresses are on the order of 10%. At a 10:1 twist ratio, however, the additional strain is about 0.3%, or 50% above nominal. This is a significant imposition on the outermost ropes, and will cause premature failure along the edges.

The same strategy of pretensioning the center ropes with respect to the outer ropes during molding can be used to counter the effect of additional parabolic strain at twisted spans. During molding, a parabolic bubble of additional tension is applied to the center ropes, with the ropes at the periphery being held at low tension. As the belt is released from the mold, the outermost ropes will relax. Once put into service in twisted conditions, the total tension distribution will even itself out in a manner not possible with conventionally molded belts.

It is convenient that a parabolic pretensioning of the center ropes of the molded belt can perform both the functions of widening the total fleet angle tolerance at a given service life expectation as well as normalizing tension within the strands of a twisted belt span. The degree of pretension asymmetry remains to be defined on an application-by-application basis. A greater amount of asymmetry during molding will allow for more aggressive twists within a reeving system, but will also create a greater degree of tension asymmetry in straight spans. In well-aligned applications it will be wise to split the difference, which is to suggest that the net difference in tension from the outer edge to the centerline within a twisted span be equal in magnitude but opposite in sign to the net difference in tension from the outer edge to the centerline of a straight span.

Additionally, sheaves of a non-flat geometry will prove useful in the endeavor of ensuring equal tension amongst the reinforcing ropes of a flat belt. Crowned pulleys, in addition to providing means of alignment, create excess pressure on the center portion of the belt which results in excess tension within the ropes. At first glance this may seem favorable, as it also provides a potential means to address the high edge tension in a twisted sample. However, it's important to point out that the crowning provides excess center tension on the sheave itself, not in free space, where it has no dominion. Thus, the free span of twisted belt will maintain its negative parabolic distribution within its cross section in the free span, which will transfer over to the positive parabolic distribution on the crown. These two phenomena meet in the middle at the engagement interface, potentially equalizing out the tension at the point of tribological contact. It may also result in premature failure due to tension-tension fatigue, as the outer ropes shed their tension to the inner ropes when run over a crowned sheave.

A sheave with an slightly inverted crown may also prove to be valuable. Though it will create instability for the belt's position, it will also create excess tension along the outer edges of the belt, in a manner analogous to what a twisted span experiences. If the two tension profiles can be matched, then the center pretensioning while molding procedure as described herein can invert the effects of both tension profiles, creating a truly normalized tension profile both within free twisted spans and on the sheave itself.

Twisted spans of belt have the detrimental effect of creating a parabolic tension profile within the belt. However, they also have the positive effect of enabling a greater degree of fleet angle tolerance. A belt that is untwisted is quite stiff in the direction orthogonal to its principal axis of flexion, which renders fleet angle conditions to be severely destructive for belts. A twisted belt, on the other hand, has along its free span cross sections which are vertical in orientation, allowing for flexion along that orthogonal axis and minimizing built-up stresses both within the span and at the engagement interface. If the parabolic tension distribution induced by the twist itself can be consistently and repeatably neutralized, twisted belt spans offer a valuable means of increasing the tolerance band of flat belt systems, potentially to a magnitude that is similar to that of wire rope.

Various embodiments provide methods of manufacturing a flat belt for use within a reeving system containing substantial fleet angles and twisted spans. The method include tensioning one or more cords of a plurality of cords being positioned in the flat belt and over-molding the plurality of cords, via at least one of extruding and injection molding, with belt jacket material positioned around the plurality of cords so as to form a flat span. The over-molding is conducted while retaining the tensioning of the one or more cords.

In some implementations, tensioning the one or more cords comprises tensioning more than one cord in the plurality of cords in a parabolic manner so as to tension one or more cords in the center of the plurality of cords more than tensioning outer cords in the plurality of cords.

In particular implementations, tensioning the one or more cords includes tensioning a wire rope.

In certain implementations, over-molding comprises over-molding the plurality of cords with polyester polyurethane as the belt jacket material.

In some implementations, the methods include releasing the tension on the one or more cords tensioned once the flat belt is cooled and formed.

Various embodiments provide methods of manufacturing a flat belt for use within a reeving system containing substantial fleet angles and twisted spans. The methods include heating the flat belt so as to soften a belt jacket of the flat belt. The belt jacket surrounds a plurality of cords positioned in the flat belt. The methods include applying tension to one or more cords of the plurality of cords. The methods include retaining the tension applied to the one or more cords until the flat belt is cooled and reformed.

Various embodiments also provide flat belts for use within a reeving system containing substantial fleet angles and twisted spans. The flat belts include an over-molded jacket. The flat belts include a row of a plurality of cords positioned in the over-molded jacket, wherein one or more cords of the plurality of cords are tensioned within the over-molded jacket, and wherein one or more cords in the center of the row of the plurality of cords is tensioned more than outer cords in the plurality of cords.

In various implementations, the cords in the plurality of cords are tensioned in a parabolic manner so as to tension one or more cords in the center of the plurality of cords more than outer cords in the plurality of cords.

In particular implementations, cords in the plurality of cords are of a hollow core construction.

In certain implementations, the flat belts include sheaves with at least one of a standard crown profile or an inverted crown profile retaining the plurality of cords so as to normalize tension within cords across a cross section of the belt so as to extend the service life of the belt.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawing primarily is for illustrative purposes and is not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawing, like reference characters generally refer to like features (e.g., functionally similar and/or structurally similar elements).

The features and advantages of the inventive subject matter disclosed herein will become more apparent from the detailed description set forth below when taken in conjunction with the drawings.

DETAILED DESCRIPTION

Following below are more detailed descriptions of various concepts related to, and exemplary embodiments of, a method of manufacture for a flat belt intended for use in reeving systems.

Figure 1:
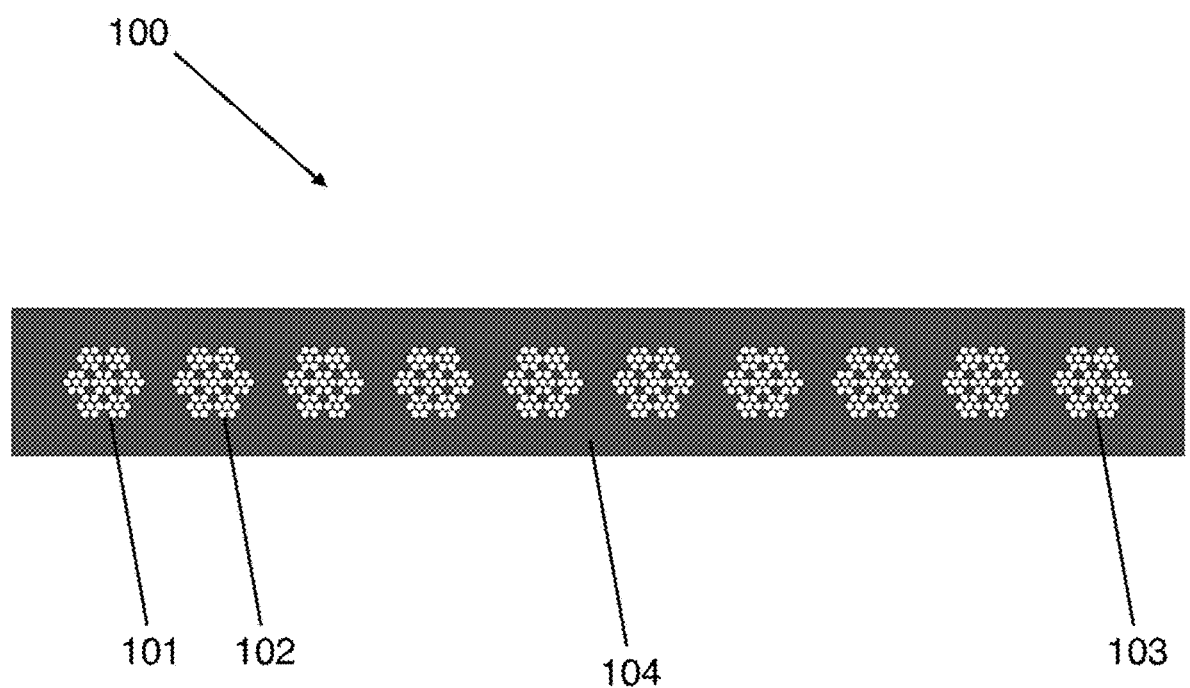
FIG. 1 illustrates a typical cross section of a modern steel-reinforced flat belt.

FIG. 1 illustrates the cross section of a modern flat belt used in lifting applications. A flat belt 100 is comprised of a polyurethane jacket 104 that encompasses multiple steel wire ropes 101, 102, 103. The number of wire ropes and the construction of the ropes varies depending on the application and a cost target, with more complex constructions providing higher performance at a cost premium.

Figure 2:
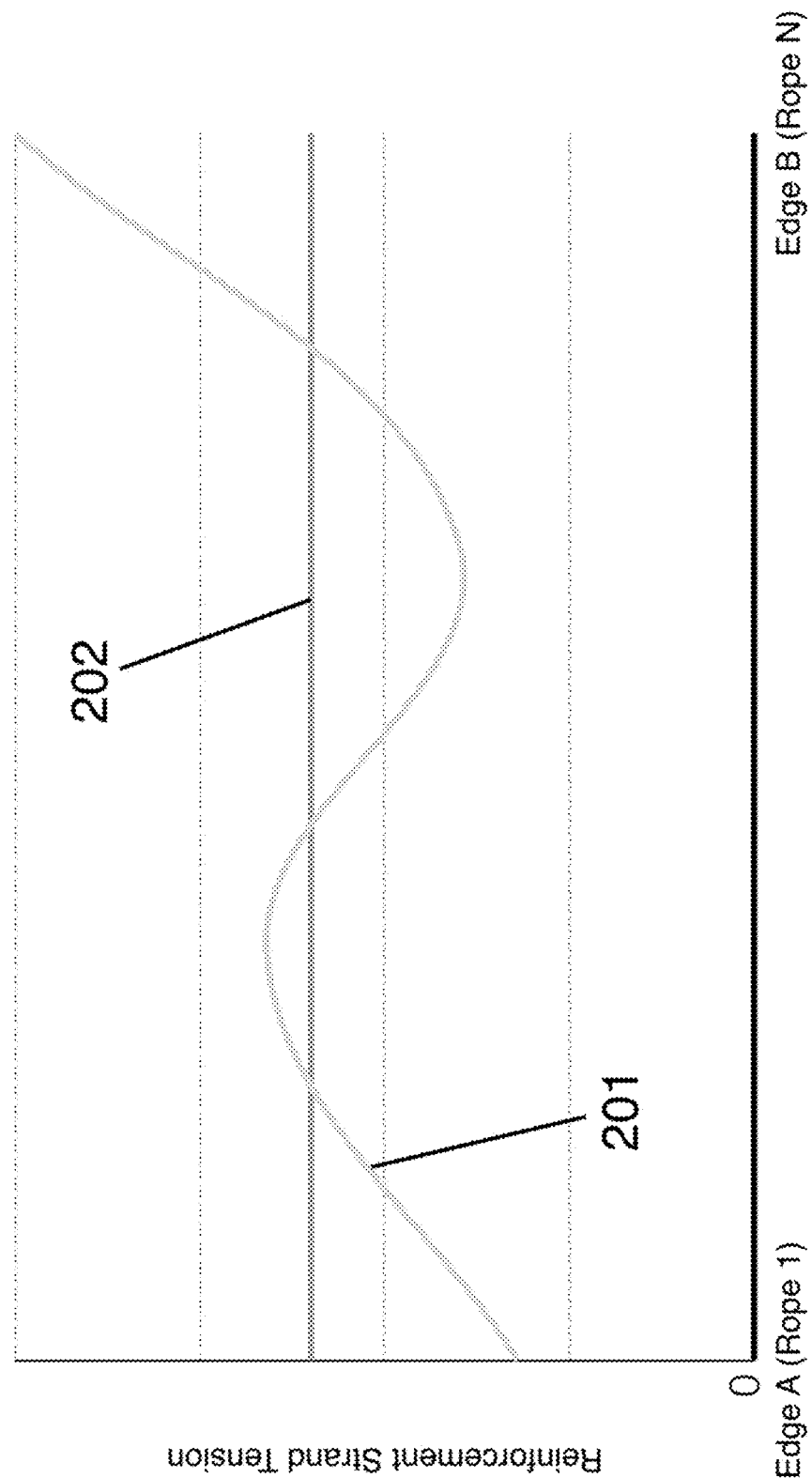
FIG. 2 depicts the normalized pretension technique currently in use for flat belts.

FIG. 2 depicts the tension profile of a conventionally molded flat belt. Initially, careful attention was not paid to the tension of each individual wire rope as it was over-molded. The pretension profile 201 is of a low magnitude, relative to the tension carrying capacity of the ropes, and is an exemplary illustration of a set of ropes whose pretensions are by no means guaranteed to be similar in magnitude. The pretension profile 202 is also of a low magnitude, but is uniform in nature so as to enable a uniform tension distribution within the working ropes during service.

Figure 3:
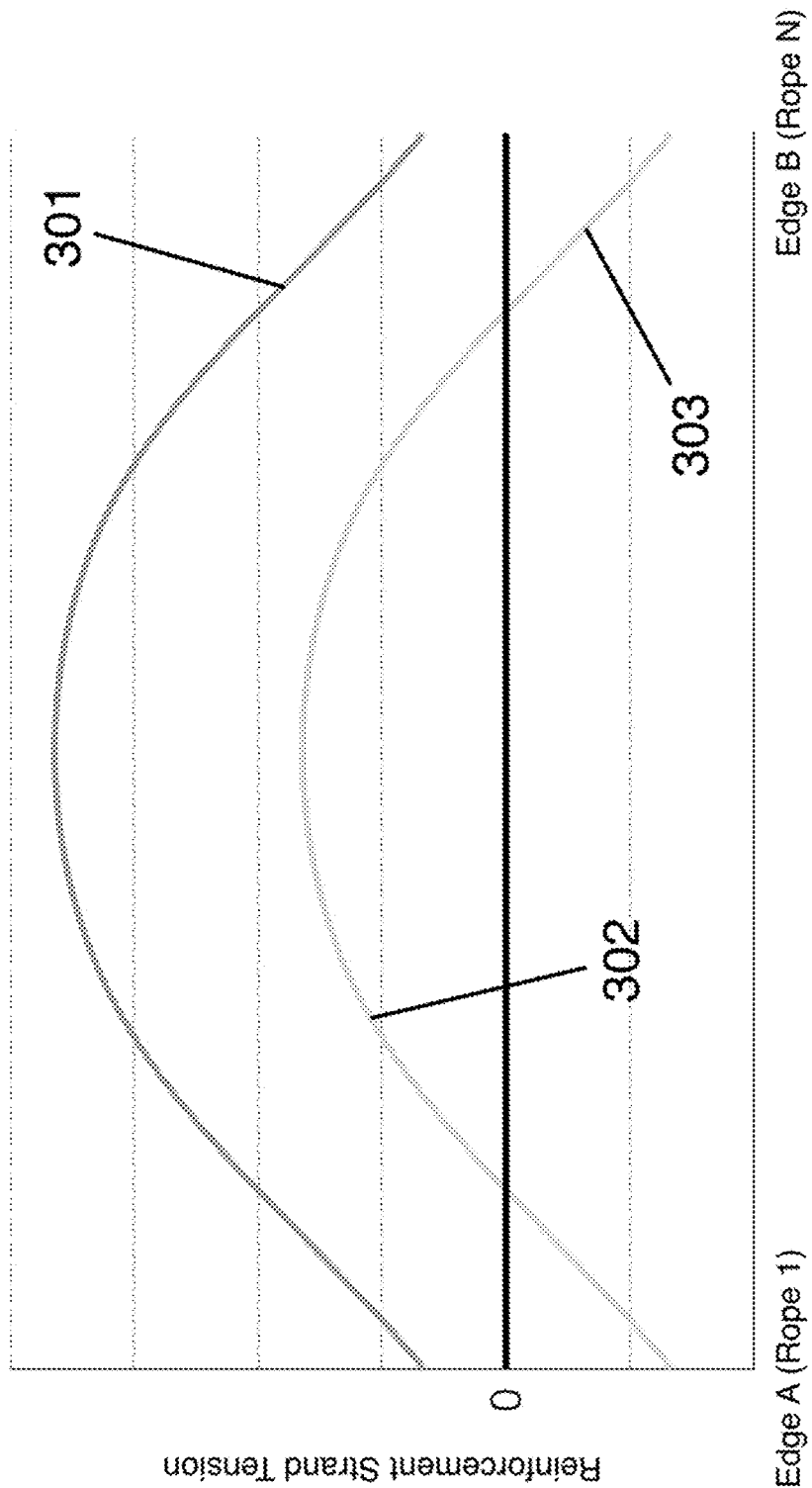
FIG. 3 is an exemplary illustration of the belt tension profile during molding the molding process as well as the relaxed state of the released belt.

FIG. 3 shows the suggested modification to the pretension profile for use in reeving systems that have significant misalignments present. The pretension profile 301 is imposed upon the set of wire ropes (1, 2, 3 ... N) during the molding process in a manner which is nearly parabolic and is substantially the opposite of the tension profile that is induced during twisted service. Once released from the molding or extrusion machine, the belt will relax slightly to form the tension profile 302, in which the outer strands 303 will be relaxed in a state of slight compression. A state of net tension of the profile will still be evident, as the polyurethane jacket will provide some of the compression response as relaxation occurs. In particular implementations, actively driven spools or pulleys may be used to impart tension onto the strands during the molding process. In implementations where an existing flat belt is modified, the ends of the wire ropes can be exposed, for example via cutting and the flat belt can be put on a long tensioning jig. The entire jig can then be placed into an oven that would heat it sufficiently past the glass transition temperature, but not beyond the melting temperature. Tension can then be applied via the jig and the belt can be allowed to cool while the tension is maintained.

Figure 4:
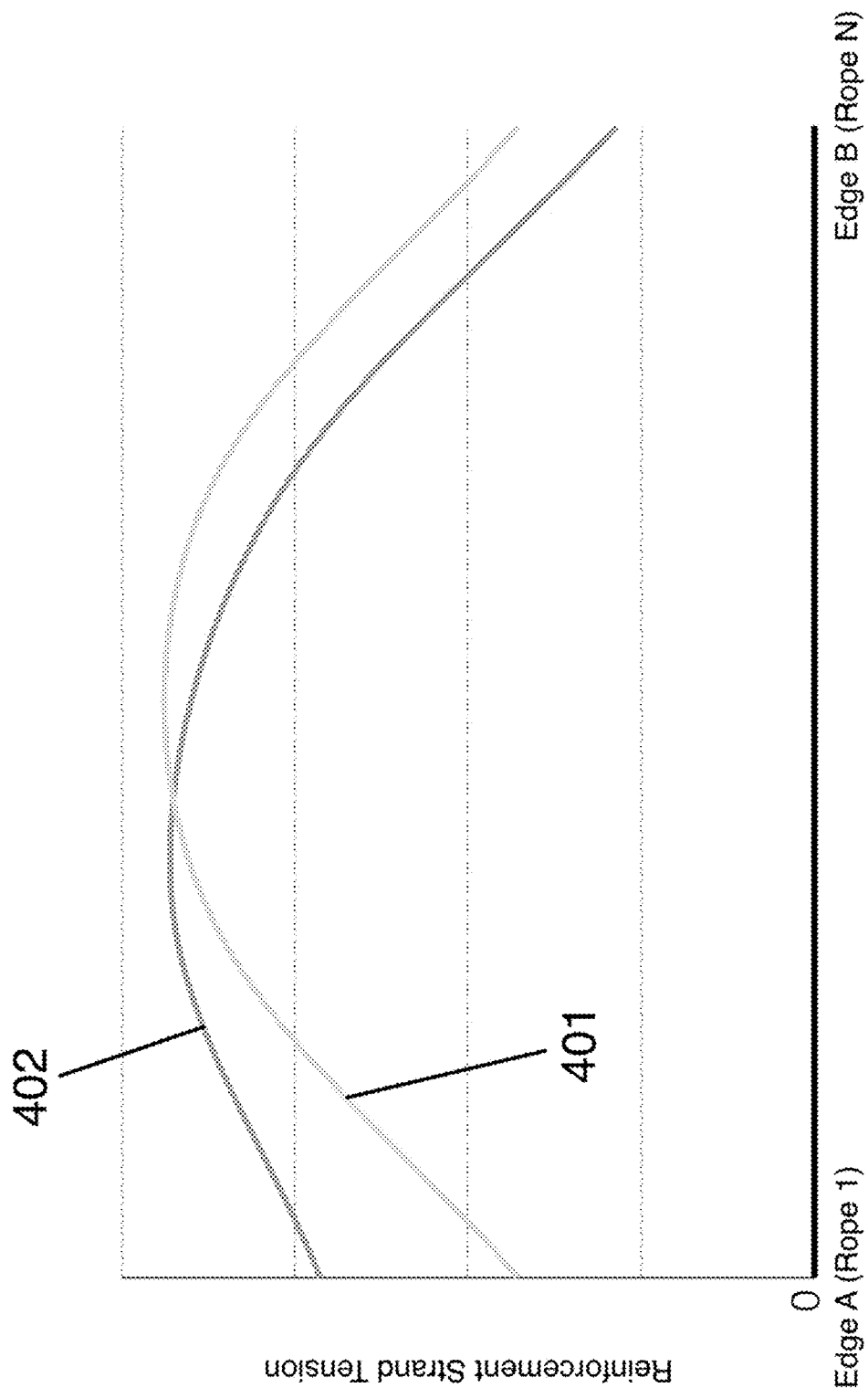
FIG. 4 presents the tension distribution of the belt during service in aligned and misaligned conditions.

FIG. 4 illustrates the flat belt with a modified pretension scheme during its service at working tension. In the case of proper alignment and straight spans, an exemplary tension distribution 401 will be present in which the center strands carry more of the working load. In the case of slight misalignment, an exemplary tension distribution 402 will shift laterally, similar to the behavior of a conventionally molded belt but without exceeding maximum tension along the edges.

Figure 5:
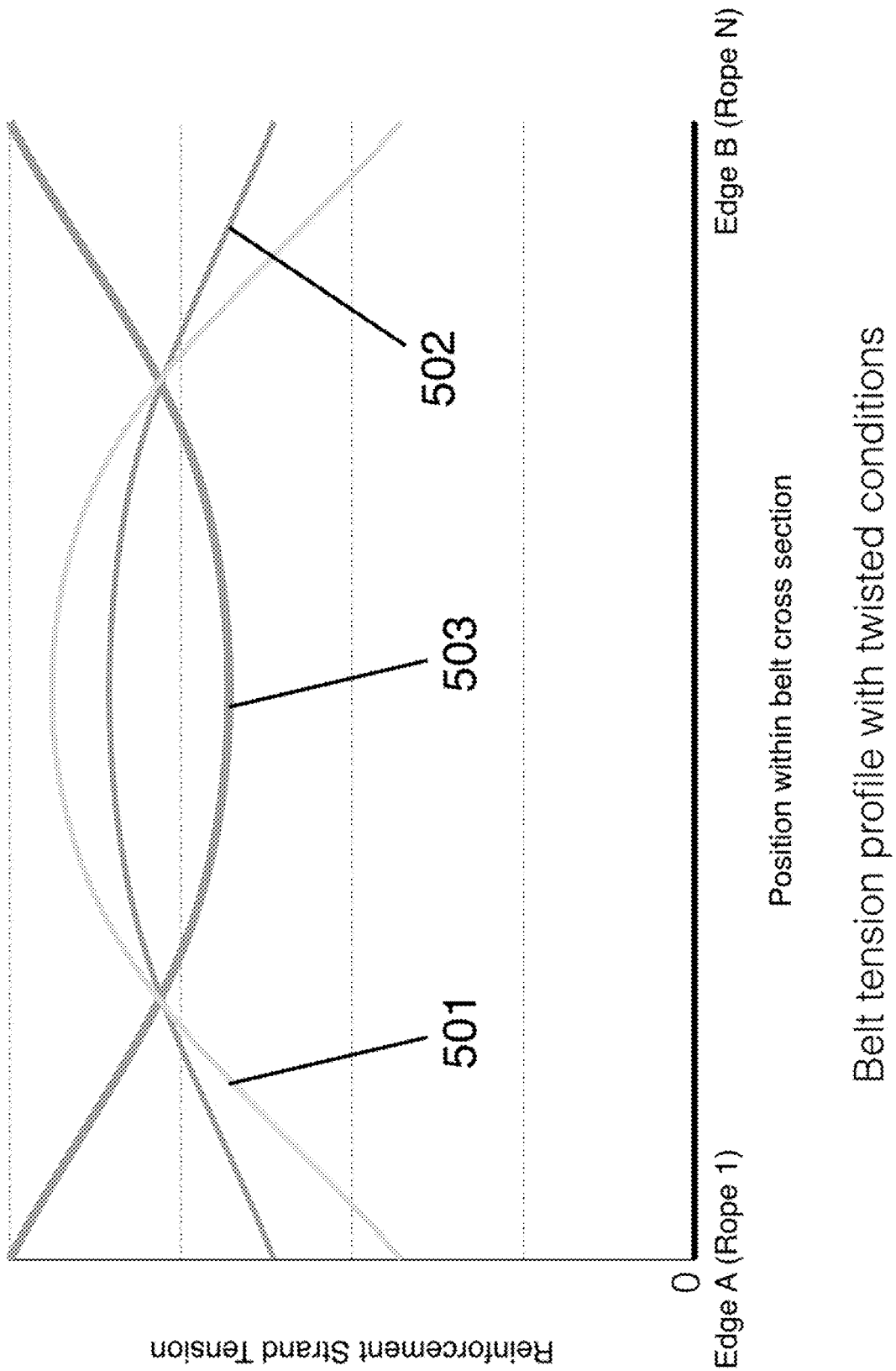
FIG. 5 presents the tension distribution of the belt during service within a twisted span.

FIG. 5 shows the effect of the modified pretension scheme on a twisted free span. A conventionally molded belt with equitably tensioned cords during molding will form a concave parabolic "U" of tension during twisted service, indicated by the exemplary tension distribution 503. The edges of the belt experience the greatest tension and sheave pressure, and will wear out prior to other parts of the belt. In the case of a flat belt which relies on a properly calibrated convex pretension scheme, the straight-span tension profile 501 will flatten to form exemplary tension distribution 502 as the concave parabolic addition of tension is added to the initial convex pretension.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of spring systems or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, describes techniques, or the like, this application controls.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of manufacturing a flat belt comprising:
tensioning one or more cords of a plurality of cords being positioned in the flat belt, wherein the plurality of cords comprises one or more inner cords and one or more outer cords, and wherein the one or more inner cords are tensioned more than the one or more outer cords; and
jacketing the plurality of cords, with belt jacket material positioned around the plurality of cords so as to form a flat span, wherein the jacketing is conducted while retaining the tensioning of the one or more cords.

2. The method of claim 1, wherein tensioning the one or more cords comprises tensioning more than one cord in the plurality of cords in a parabolic manner.

3. The method of claim 1, wherein tensioning the one or more cords comprises tensioning a wire rope.

4. The method of claim 1, wherein jacketing comprises over-molding the plurality of cords with polyester polyurethane as the belt jacket material.

5. The method of claim 1, further comprising releasing the tension on the one or more cords tensioned once the flat belt is cooled and formed.

6. A method of enhancing a flat belt for use within a reeving system containing substantial fleet angles and twisted spans, the method comprising:
heating the flat belt so as to soften a belt jacket of the flat belt, the belt jacket surrounding a plurality of cords positioned in the flat belt;
applying tension to one or more cords of the plurality of cords, wherein the plurality of cords comprises one or more inner cords and one or more outer cords, and wherein the one or more inner cords are tensioned more than the one or more outer cords; and
retaining the tension applied to the one or more cords while the flat belt is allowed to cooled to an ambient temperature.

7. A flat belt comprising:
a jacket; and
a plurality of cords positioned in the jacket, wherein the plurality of cords comprises one or more inner cords and one or more outer cords, and wherein, when the belt is in a relaxed state, the one or more inner cords are tensioned more than the one or more outer cords in the plurality of cords.

8. The flat belt according to claim 7, wherein the cords in the plurality of cords are tensioned according to a parabolic function based on their position relative to a center of the belt.

9. The flat belt according to claim 7, wherein cords in the plurality of cords are of a hollow core construction.

10. The flat belt according to claim 7, further comprising sheaves with at least one of a standard crown profile or an inverted crown profile retaining the plurality of cords so as to normalize tension within cords across a cross section of the belt.

* * * * *